United States Patent
Riviére

(10) Patent No.: US 6,929,429 B2
(45) Date of Patent: Aug. 16, 2005

(54) MILLING TOOL AND CUTTING INSERT THEREFOR

(75) Inventor: Bertrand Riviére, Bourges (FR)

(73) Assignee: Seco Tools AB, Fagersta (SE)

( * ) Notice: Subject to any disclaimer, the term of this patent is extended or adjusted under 35 U.S.C. 154(b) by 0 days.

(21) Appl. No.: 10/681,153

(22) Filed: Oct. 9, 2003

(65) Prior Publication Data

US 2004/0131432 A1 Jul. 8, 2004

(30) Foreign Application Priority Data

Oct. 10, 2002 (SE) .............................................. 0203003

(51) Int. Cl.$^7$ ................................................ B26D 3/00
(52) U.S. Cl. ..................................... 407/113; 407/114
(58) Field of Search ........................... 407/40, 113, 114, 407/115, 116, 101, 102, 103

(56) References Cited

U.S. PATENT DOCUMENTS

| | | | |
|---|---|---|---|
| 3,955,259 A | 5/1976 | Gustafsson | |
| 4,130,371 A | * 12/1978 | Druxeis | 407/114 |
| 4,790,693 A | * 12/1988 | Koblesky | 407/35 |
| 5,441,370 A | * 8/1995 | Pantzar et al. | 407/113 |
| 5,454,671 A | 10/1995 | Qvarth | |
| 5,800,079 A | * 9/1998 | Qvarth | 407/46 |
| 5,957,629 A | 9/1999 | Hessman et al. | |

FOREIGN PATENT DOCUMENTS

| | | |
|---|---|---|
| DE | 101 34 636 A1 | 4/2002 |
| EP | 0 555 192 A1 | 8/1993 |
| EP | 0 873 808 A1 | 10/1998 |
| EP | 0 873 808 | 10/1998 |

* cited by examiner

*Primary Examiner*—Willmon Fridie, Jr.
(74) *Attorney, Agent, or Firm*—Burns, Doane, Swecker & Mathis, LLP

(57) ABSTRACT

A milling tool includes a rotary milling body forming pockets for receiving respective cutting inserts. Optional cassettes can be mounted in the pockets to receive the inserts. Each insert includes two side surfaces interconnected by four edge surfaces. The insert is double-sided in that each side surface includes two pairs of cutting edges. Each pair of cutting edges includes major and minor cutting edges meeting each other at a cutting corner of the insert. One of the side surfaces includes two cutting corners disposed at opposite ends of one of the edge surfaces, and the other side surface includes two cutting corners disposed at opposite ends of another, opposite edge surface. Each of those two opposite edge surfaces includes a recess for receiving an abutment surface situated at the respective pocket, for defining a stop surface for the insert from moving in a direction parallel to the axis of rotation.

20 Claims, 4 Drawing Sheets

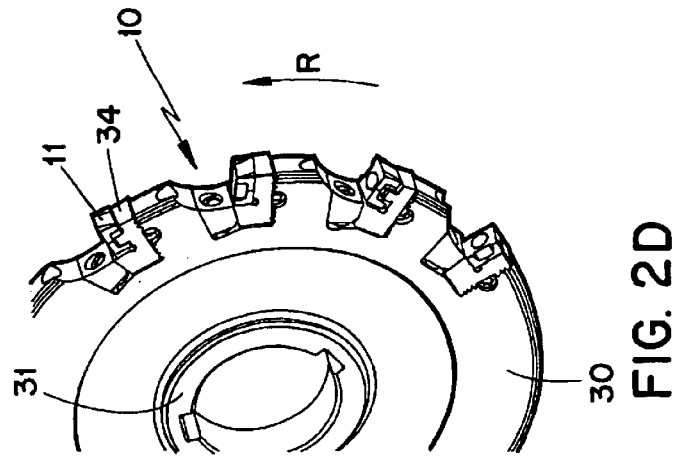
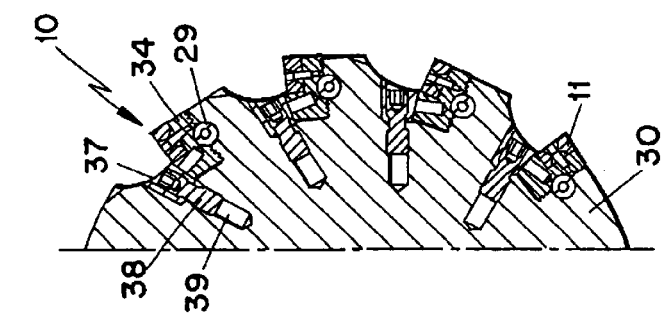
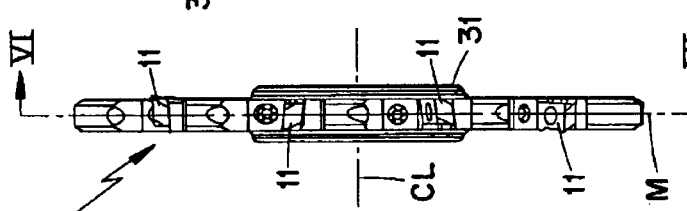
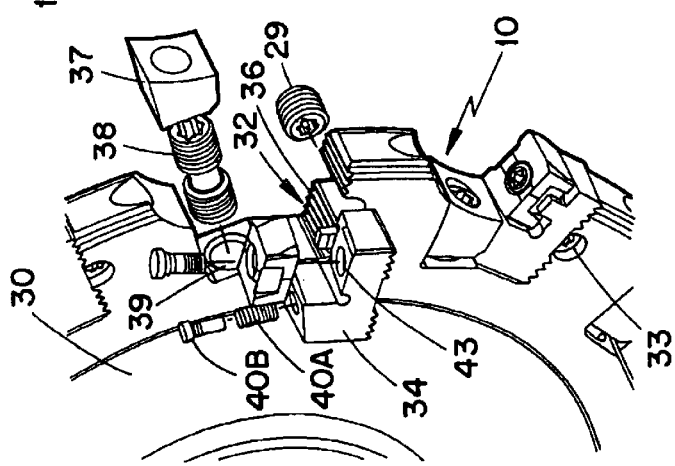
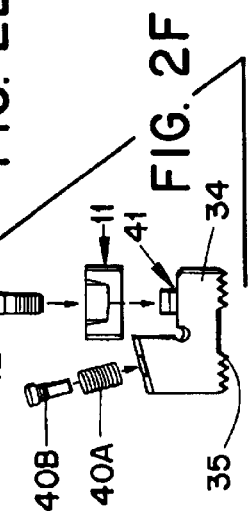
FIG. 2D
FIG. 2C
FIG. 2B
FIG. 2E
FIG. 2F

MILLING TOOL AND CUTTING INSERT THEREFOR

This application claims priority under 35 U.S.C. §§119 and/or 365 to Patent Application Serial No. 0203003-9 filed in Sweden on Oct. 10, 2002, the entire content of which is hereby incorporated by reference.

BACKGROUND OF THE INVENTION

The present invention relates to a tool and a cutting insert for milling, especially disc milling.

In disc milling cutters, the periphery of the rotary milling body is equipped with a number of circumferentially spaced-apart cutting inserts, which protrude alternately from opposite sides of the milling body. The relative displacement of the cutting inserts is made in order to obtain, in the workpiece, clearance and in order to obtain grooves having perpendicular bordering surfaces. The bottom surface of the groove is provided by means of the major cutting edges of the cutting inserts, while the side surfaces of the groove are provided by means of the minor cutting edges extending substantially perpendicularly to the major cutting edges. Radii between the bottom surface and the side surfaces of the groove are obtained by means of somewhat rounded cutting corners at a transition between associated pairs of major and minor cutting edges of the cutting insert. The relative displacement to opposite sides of the milling body requires that the cutting inserts be provided in right-hand and left-hand embodiments in order to guarantee the requisite clearance between the side wall and the portion of the cutting insert following the minor cutting edge.

Through EP-A-0 873 808 a single sided cutting insert is previously known, which comprises only two, but different, cutting edges, to avoid possible mix-up by the operator. The known cutting insert means poor utilization of the possibilities of the cutting material. In Qvarth U.S. Pat. No. 5,454,671, another single sided cutting insert is shown.

OBJECTS OF THE INVENTION

An object of the present invention is to provide a double sided cutting insert for optimal utilization of the edges of the cutting insert.

Another object of the present invention is to provide an easy-cutting double sided cutting insert.

Another object of the present invention is to provide a double sided cutting insert having a good support near the point of action of the cutting forces.

Another object of the present invention is to provide a milling tool that counteracts movements of the cutting insert.

Another object of the present invention is to provide a milling tool and a cutting insert, which avoid negative effects of defects around holes or irregularities in insert pocket or on cutting insert.

Another object of the present invention is to provide a milling tool, the lateral support of which does not damage the cutting edge laterally.

Another object of the present invention is to provide a milling tool, which is simple to manufacture to narrow tolerances.

Another object of the present invention is to provide a milling tool having an insert pocket, the geometry of which permits that it accepts varying corner shapes such as radius, chamfer, wiper or another shape.

Another object of the present invention is to provide a milling tool having an insert pocket, the geometry of which permits that overhang of the cutting insert may be held at a minimum.

SUMMARY OF THE INVENTION

One aspect of the invention relates to an indexable cutting insert for milling. The insert has a rectangular basic shape and comprises first and second side surfaces intersected by first, second, third, and fourth edge surfaces. The first and second edge surfaces lie opposite one another, and the third and fourth edge surfaces lie opposite one another. The insert includes four pairs of cutting edges, each pair of cutting edges including a major cutting edge and a minor cutting edge meeting at a respective cutting corner of the insert. Two of the major cutting edges are formed by transitions between the first side surface and the first and second edge surfaces, respectively, and the remaining two major cutting edges are formed by transitions between the second side surface and the first and second edge surfaces, respectively. The insert is a double-sided insert with the side surfaces constituting rake faces and the edge surfaces constituting flank faces. The first side surface has the remaining two of the cutting corners whose minor cutting edges are each formed by a transition between the first side surface and the third edge surface. The second side surface has two of the cutting corners whose minor cutting edges are each formed by a transition between the second side surface and the fourth edge surface. Each of the first and second side surfaces is interconnected by a clamping cavity which defines a center axis. A cutting corner of the first side surface located diagonally opposite a cutting corner of the second side surface defines therewith a bisector plane of the insert, which plane substantially contains the center axis. The third and fourth edge surfaces provide positive clearance and are substantially parallel with one another. Another aspect of the invention involves a milling tool which includes such cutting inserts.

BRIEF DESCRIPTION OF THE DRAWINGS

The objects and advantages of the invention will become apparent from the following detailed description of a preferred embodiment thereof in connection with the accompanying drawing in which like numerals designate like elements.

FIG. 2B shows the milling tool in top view.

FIG. 2C shows a cross-section according to the line VI—VI in FIG. 2B.

FIG. 2D shows a part of the milling tool in perspective view.

FIG. 2E shows a part of the milling tool according to FIG. 2D partly in an exploded view.

FIG. 2F shows parts of the milling tool in an exploded view.

DESCRIPTION OF A PREFERRED EMBODIMENT OF THE INVENTION

Reference being made to FIGS. 1A–1H, a cutting insert 11 for disc milling according to the present invention is shown. The cutting insert consists of a plate of sintered, preferably coated, cemented carbide and has a polygonal basic shape, in this case a rectangular basic shape in the view according to FIG. 1A. The cutting insert 11 comprises first and second opposite, substantially parallel, side surfaces 12, 13 as well as first, second, third and fourth edge surfaces 14A–14D uniting them. The side surface 13 is identical to the side surface 12 if the cutting insert is rotated 180° around the line III—III in FIG. 1A, and therefore substantially only one of the side surfaces is disclosed in detail hereinafter. The cutting insert 11 has a negative basic shape in that the side surfaces 12 and 13 have equally large areas.

The edge surfaces or the negative sides 14A and 14B are intended to constitute flank surfaces for associated major cutting edges 15A and 15B, respectively. The negative sides 14A and 14B provide negative clearances and are substantially parallel with each other. The major cutting edges 15A, 15B are arranged to cut the majority of the material that should be removed, in the form of chips. The edge surfaces 14A and 14B are mutually opposite and substantially parallel with each other and form a substantially right angle to an imaginary extension P of the planes for the side surfaces 12 and 13.

Figure 1A:
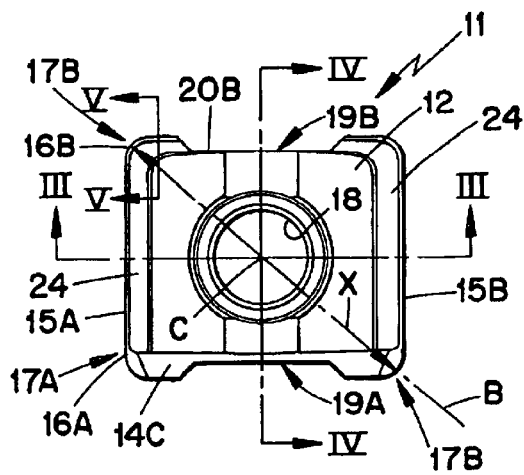
FIG. 1A shows a cutting insert according to the present invention in planar view.
Figure 1B:
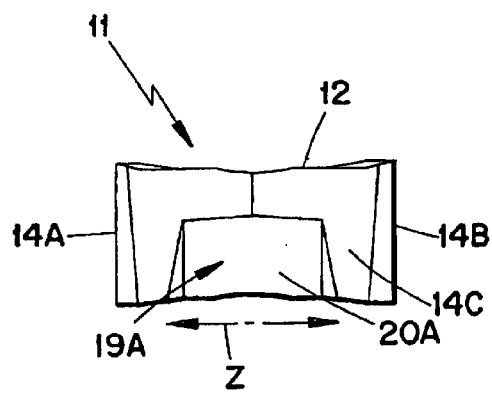
FIG. 1B shows the cutting insert in side view.
Figure 1C:
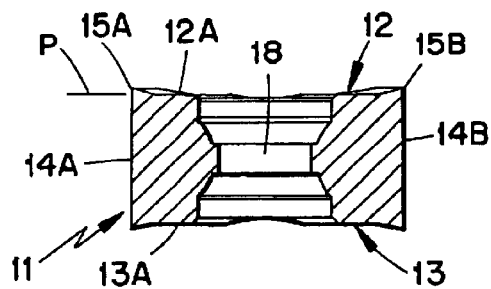
FIG. 1C shows the cutting insert in cross-section according to the line III—III in FIG. 1A.
Figure 1D:
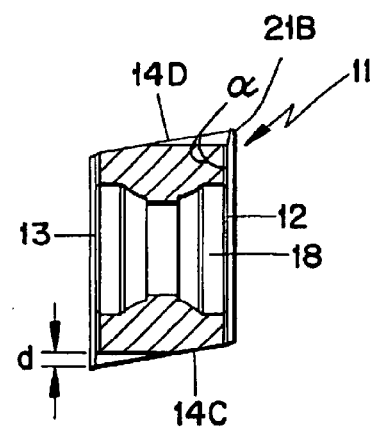
FIG. 1D shows the cutting insert in cross-section according to the line IV—IV in FIG. 1A.
Figure 1E:
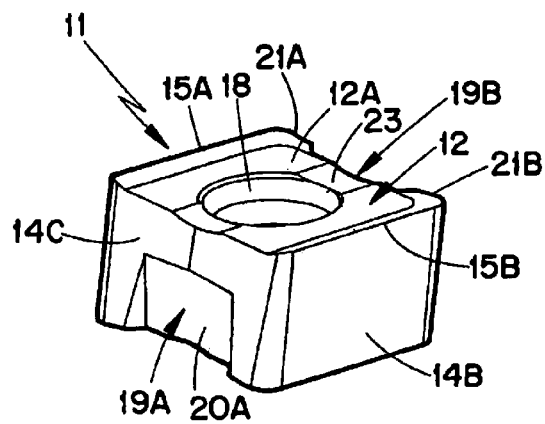
FIGS. 1E and 1F shows the cutting insert in two perspective views.
Figure 1F:
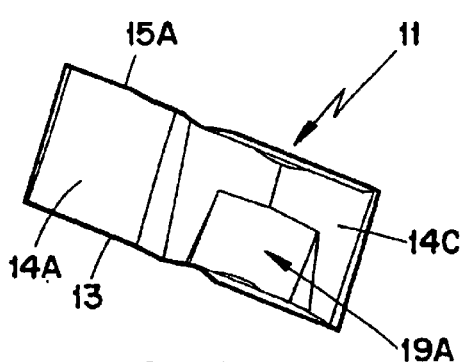
Figure 1G:
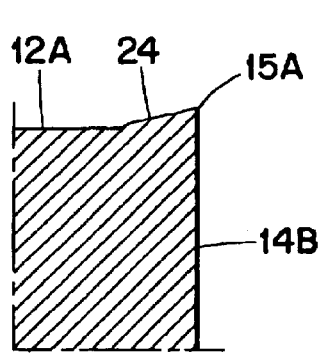
FIG. 1G shows the cutting insert in an enlarged cross-section according to the line III—III in FIG. 1A.
Figure 1H:
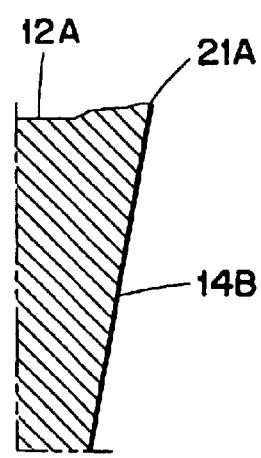
FIG. 1H shows the cutting insert in an enlarged cross-section according to the line V—V in FIG. 1A.

In the view according to FIG. 1D, the cutting insert substantially forms an equilateral parallelogram, the angles of which are not right angles. The edge surfaces (positive sides) 14C and 14D provide positive clearances and are substantially parallel with each other. The surfaces 14C and 14D form an acute transition angle α relative to the associated side surface 12 and 13, respectively, during milling. The angle α is less than 90° and is preferably chosen within the interval of 70–85°.

The major cutting edges 15A, 15B are substantially straight as well as parallel with the plane P of the side surface 12. Two of the major cutting edges 15A, 15B are disposed at a transition between the first side surface 12 and respective ones of the first and second edge surfaces 14A and 14B, whereas the other two major cutting edges 15C, 15D are disposed at a transition between the second side surface 13 and respective ones of the first and second edge surfaces 14A, 14D. Diametrically opposite cutting corners 17B, 17A on different sides of the cutting insert 11 are intersected by a bisector plane B which substantially contains the center C of an insert hole 18. The insert hole 18 is through-going and the smallest diameter thereof is at in the midst of the cutting insert in the view according to FIG. 1C. The insert hole forms a cavity in each side surface intended to receive a clamping element 42. Alternatively, the insert hole may consist of two aligned blind holes each forming a respective cavity.

The distance X (FIG. 1A) between the diametrically opposite cutting corners 17B, 17A on different sides of the cutting insert constitutes the longest dimension of the cutting insert. The distance X exists at only two positions. The end 16B of each major cutting edge, which forms a cutting nose radius, has a larger radius of curvature than the opposite end 16A. The end 16A is most often not intended to cut in the workpiece. Each major cutting edge 15A, 15B connects, via the nose radius 16B, to a minor cutting edge 21A, 21B. Only a major cutting edge and a minor cutting edge should be in engagement simultaneously, and thereby these two edges operate as a pair. It will be appreciated that there are two of these pairs of cutting edges on each side surface 12, 13.

Two opposite edge surfaces 14C and 14D include first recesses 19B and 19A, respectively. Each bottom 20A, 20B of a recess is substantially perpendicular to the plane P. Each recess 19A, 19B intersects only one side surface 13, 12 in an area Z between two minor cutting edges 22A, 22B. Each recess has a depth d increasing in the direction of the side surface that the recess intersects. The recess limits the extension of the respective minor cutting edge 21A, 21B in the direction substantially perpendicularly to the major cutting edges 15A, 15B.

Figure 2A:
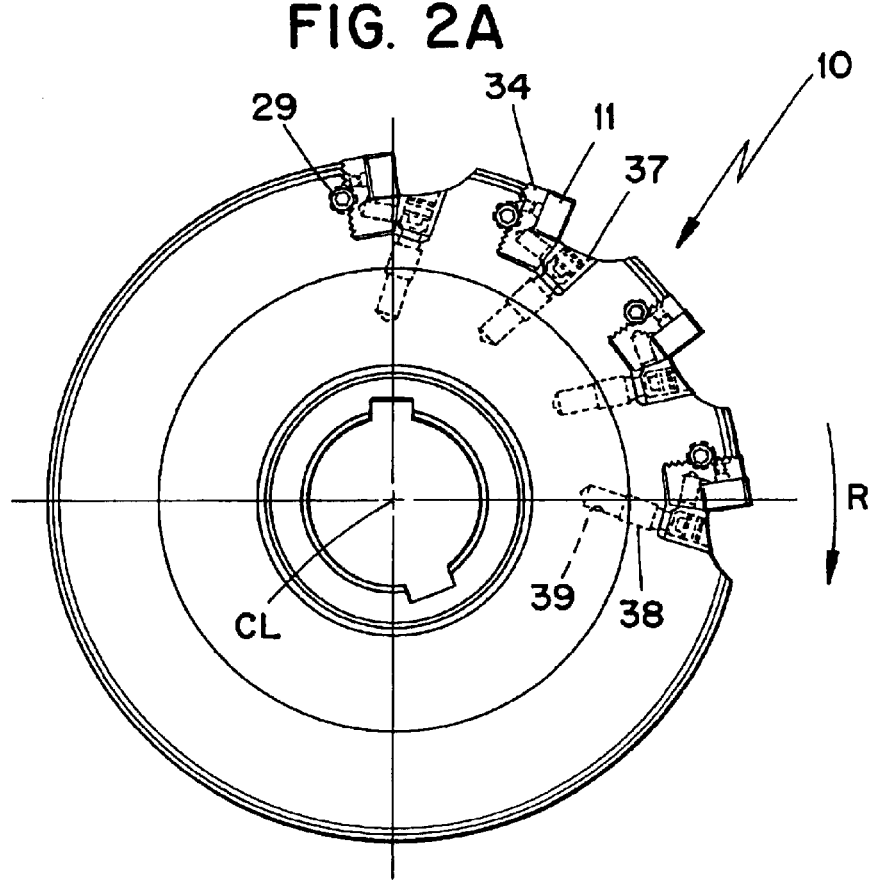
FIG. 2A shows a milling tool according to the present invention in an axial view from one of the sides, only four cutting parts being shown.
Figure 2I:
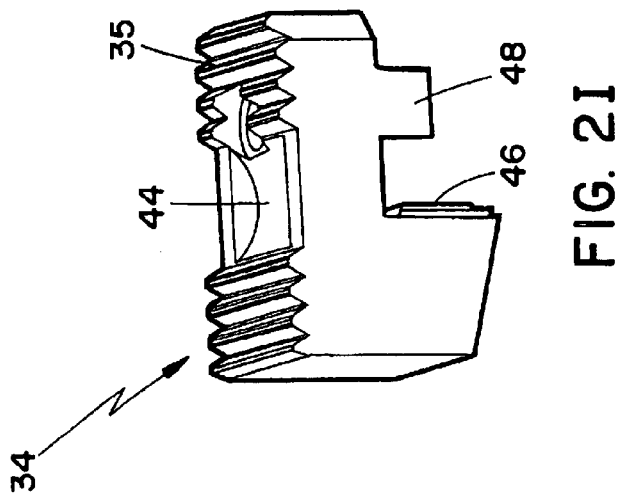
FIGS. 2G, 2H and 2I shows a cassette in different views.
Figure 2G:
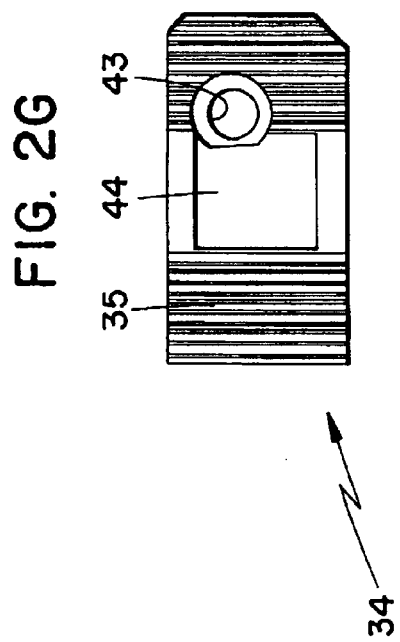
Figure 2H:
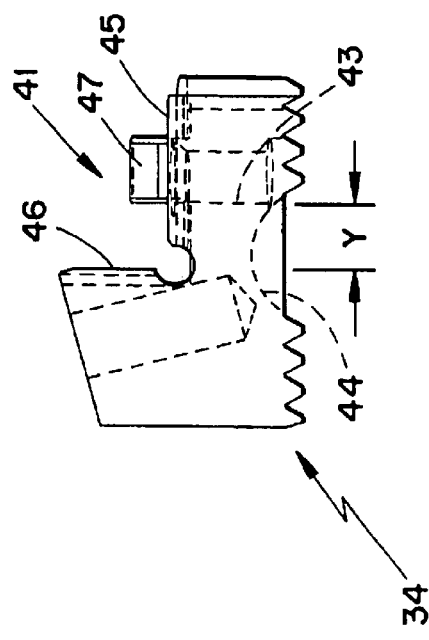

Each side surface 12, 13 has an elongate second recess 23, which extends on both sides of the cavity formed by the insert hole 18. The recess 23 removes negative effects of defects around holes or irregularities in the insert pocket or on the cutting insert by partitioning the active support surfaces 12A, 13A. The recess 23 connects to a planar surface 12A, 13A, which should constitute support or contact surfaces against the base surface 45 of the insert pocket, see FIG. 2H. The length of the recess 23, parallel with the major cutting edge, is by virtue of the shape of the cutting insert different on respective sides of the insert hole 18. Each planar surface 12A, 13A connects to an upwardly and outwardly rising rake face 24, which connects to the associated cutting edge, for instance 15A, 16B and 21A. Thus, the side surface 12, 13 of the cutting insert comprises a positive, concave rake face.

In FIGS. 2A–2F, a disc milling tool 10 according to the present invention is shown, comprising a milling body 30 intended to be rotated in a milling machine. The cutting inserts in said figures are schematically illustrated. The milling body 30 is plate-shaped and is intended to rotate around the center axis CL in the direction R. The milling body 30 has a central hub portion 31 and a plurality of peripheral recesses 32, which usually are substantially equidistantly arranged around the periphery of the milling body 30. In each recess 32, an insert-carrying cassette 34 is received, wherein the cassette may comprise the entire width of the milling body or possibly be somewhat wider than the same. The rear side surface 35 of the cassette in the direction of rotation is substantially axially grooved and is brought in engagement with a correspondingly grooved surface 36 in the recess 32. The grooved surface 36 comprises in the center thereof an axially extending, threaded recess 33. The recess 33 is a cylindrical hole having open ends and opens in the direction of rotation R. The side surface 35 comprises a partly cylindrical, non-threaded recess or cavity 44 (FIG. 2H) intended to receive an outer part of the screw 29 after the screw has been threaded into the threaded hole 33 in the milling body, whereby the cassette may be fine-adjusted axially. When the position of the cassette has been determined, it is clamped by fastening a wedge 37 by means of, for instance, a differential screw 38, the two threaded end portions of which are threaded in separate directions. The screw is threaded down into a threaded hole 39 in the recess 32. In order to give certain stability during assembly and fine adjustment, a compression spring 40A having an abutment element 40B is arranged in a hole in the cassette 34 in order to press against the wedge 37. An insert pocket 41 is formed in the cassette at the radially outer portion thereof being in front in the direction of rotation, in which pocket a cutting insert 11 is mounted by means of a locking screw 42, which is threaded into a threaded hole 43 in the cassette.

The insert pocket 41 comprises a base surface or a tangential support surface 45, a first shoulder or a radial support surface 46 and a second shoulder or an axial support surface 47. The surfaces 45-47 are mutually substantially perpendicular in order to support the cutting insert 11 as well as comprise clearances in order to avoid contact with the cutting edges 15A, 15B, 21A, 21B. The second shoulder 47 faces in a direction parallel to the center line CL of the disc as well as arranged on a projection 48, which is arranged at a distance Y from the first shoulder 46, in order for the shoulder 47 to fit together with a respective one of the recesses 19A, 19B of the cutting insert. The width of the projection is somewhat smaller than the width of the area Z, FIG. 1B, in order to ensure that the shoulder 47 abuts against the bottom surface 20A, 20B at assembly but preferably not against the clearance of the minor cutting edge.

The disc milling cutter 10 has two types of cassettes which substantially differ in one regard, viz. by the fact that the projection 48 on every second cassette is arranged to the left of center plane M of the disc milling cutter, see FIG. 2B, i.e. also to the left of the center plane of the cassette, while the other cassettes are arranged to the right of the center plane of the disc milling cutter, i.e., also to the right of the center plane of the cassette. Each projection 48 is arranged so that it trails a cutting insert that leads it in the direction of rotation without coming into contact with the workpiece. As is seen foremost in FIG. 2B, the cutting insert should be mounted such that the same generally leans outwardly, corresponding to the angle α, in relation to the center line M.

The cutting insert is, for instance, mounted in the following way. The cutting insert 11 is pressed against the insert pocket 41 so that, for instance, the side surface 13 abuts against the base surface 45 of the insert pocket and, for instance, the recess 19A receives the projection 48, the screw 42 being inserted through the hole 18 of the cutting insert and into the threaded hole 43. At tightening of the screw, the passive flank surface 14A of the cutting insert will be forced additionally against the first shoulder 46 and the bottom surface 19A additionally against the second shoulder 47.

Thus, the cassettes 34 are adjusted in the milling body 30 such that the circumferentially spaced cutting inserts protrude alternately from opposite sides of the milling body. The cassette is arranged to be clamped in a known way with a clamp after fine adjusting is made.

Thus, the present invention relates to a tool and a cutting insert for milling, the double-sided cutting insert optimally utilizing the edges of the cutting insert, which makes the utilization economically advantageous. The double-sided cutting insert is easy-cutting because the same has a concave rake face. The double-sided cutting insert has recesses in the center thereof in order to secure the abutment of the cutting insert near the point of action of the cutting forces. The milling tool has a construction which prevents movement of the cutting insert. The milling tool avoids negative effects of defects around holes or irregularities in the insert pocket or on the cutting insert, the lateral supports on the negative side being entirely independent of the cutting edge. The milling tool is simple to manufacture to narrow tolerances, the geometry of the insert pocket accepting varying corner shapes such as radius, chamfer, wiper or other shapes. The geometry of the insert pocket is such that the overhang of the cutting insert may be held at a minimum.

The invention is in no way limited to the above-described embodiments. It is fully feasible to eliminate the cassettes and instead form the insert pockets directly into the milling body, which pockets would have the same shape as the cassettes (i.e., the surfaces 45, 46, 47 would be integral with the milling body). The rake face, e.g., may be formed with projections or recesses. The last-mentioned types of chipformers transfer relatively little heat to the cutting insert from the chip and thereby the problem is avoided which relates to too high temperatures in the cutting edge, such as plastic deformation and/or diffusion wear. This results in small wear of the cutting edge and consequently better service life also at high temperatures. The invention is applicable to other types of milling machining types, such as, for instance, end milling, face milling, copying milling, ramp milling, etc. Also in other respects, the invention may freely be varied within the scope of the appended claims.

What is claimed is:

1. An indexable cutting insert for milling, the insert having a rectangular basic shape and comprising first and second opposite side surfaces intersected by first, second, third and fourth edge surfaces; the first and second edge surfaces lying opposite one another, and the third and fourth side surfaces lying opposite one another; the insert including four pairs of cutting edges, each pair of cutting edges including a major cutting edge and a minor cutting edge meeting at a respective cutting corner of the insert; two of the major cutting edges formed by transitions between the first side surface and the first and second edge surfaces, respectively, and the remaining two major cutting edges formed by transitions between the second side surface and the first and second edge surfaces, respectively; wherein the insert is a double-sided insert with the side surfaces constituting rake faces and the edge surfaces constituting flank faces; the first side surface having two of the cutting corners whose minor cutting edges are each formed by a transition angle of less than ninety degrees between the first side surface and the third edge surface; the second side surface having two of the cutting corners whose minor cutting edges are each formed by a transition of less than ninety degrees between the second side surface and the fourth edge surface; each of the first and second side surfaces intersected by a clamping cavity which defines a center axis; wherein a cutting corner of the first side surface located diagonally opposite a cutting corner of the second side surface defines therewith a bisector plane of the insert which plane substantially contains the center axis; the third and fourth edge surfaces providing positive clearance and being substantially parallel with one another.

2. The cutting insert according to claim 1, wherein a distance between the diametrically opposite cutting corners that define the bisector plane constitutes a longest dimension of the insert; the first and second edge surfaces providing negative clearance and being substantially parallel with one another.

3. The cutting insert according to claim 2 wherein each of the side surfaces has a generally concave shape to form a positive rake angle.

4. The cutting insert according to claim 3 wherein each of the third and fourth edge surfaces has a recess formed therein; wherein the recess of the third edge surface intersects the second side surface at a location between the two cutting corners disposed on the second side surface and has a depth increasing as such recess approaches the second side surface, the recess of the fourth edge surface intersecting the first side surface at a location between the two cutting corners disposed on the first side surface and having a depth increasing as such recess approaches the first side surface.

5. The cutting insert according to claim 2 wherein each of the third and fourth edge surfaces has a recess formed therein; wherein the recess of the third edge surface intersects the second side surface at a location between the two cutting corners disposed on the second side surface and has a depth increasing as such recess approaches the second side surface, the recess of the fourth edge surface intersecting the first side surface at a location between the two cutting corners disposed on the first side surface and having a depth increasing as such recess approaches the first side surface.

6. The cutting insert according to claim 1 wherein each of the side surfaces has a generally concave shape to form a positive rake angle.

7. The cutting insert according to claim 1 wherein each of the third and fourth edge surfaces has a recess formed therein; wherein the recess of the third edge surface intersects the second side surface at a location between the two cutting corners disposed on the second side surface and has a depth increasing as such recess approaches the second side surface, the recess of the fourth edge surface intersecting the first side surface at a location between the two cutting corners disposed on the first and side surface and having a depth increasing as such recess approaches the first side surface.

8. The cutting insert according to claim 1 wherein each side surface includes two elongated recesses extending on respective sides of the respective clamping cavity and intersecting respective ones of the third and fourth edge surfaces.

9. The culling insert according to claim 1 wherein both of the clamping cavities are formed by a through-hole extending through the insert.

10. A milling tool comprising a rotary milling body in combination with indexable cutting inserts, the milling body defining an axis of rotation and including a plurality of circumferentially spaced insert pockets receiving respective cutting inserts; the first and second edge surfaces lying opposite one another, and the third and fourth edge surfaces lying opposite one another; each cutting insert having a rectangular basic shape and comprising first and second opposite side surfaces intersected by first, second, third and fourth edge surfaces; the insert including four pairs of culling edges spaced from the milling body, each pair of cutting edges including a major cutting edge and a minor cutting edge meeting at a respective cutting corner of the insert; two of the major culling edges formed by transitions between the first side surface and the first and second edge surfaces, and the remaining two major cutting edges formed by transitions between the second side surface and the first and second edge surfaces; wherein the insert is a double-sided insert with the side surfaces constituting rake faces and the edge surfaces constituting flank faces; the first side surface having two of the cutting corners whose minor cutting edges are each formed by a transition angle of less than ninety degrees between the first side surface and the third edge surface; the second side surface having two of the cutting corners whose minor cutting edges are each formed by a transition angle of less than ninety degrees between the second side surface and the fourth edge surface; each of the first and second side surfaces intersected by a clamping cavity which defines a center axis; wherein a cutting corner of the first side surface located diagonally opposite a cutting corner of the second side surface defines therewith a bisector plane of the insert which substantially contains the center axis, the third and fourth edge surfaces providing positive clearance and being substantially parallel with one another.

11. The milling tool according to claim 10 wherein a distance between the diametrically opposite cutting corners that define the bisector plane constitutes a longest dimension of the insert; the first and second edge surfaces providing negative clearance and being substantially parallel with one another.

12. The milling tool according to claim 10 further including cassettes mounted in respective pockets, each cassette including a groove receiving a projection of the respective pocket.

13. The milling tool according to claim 12 wherein each of the side surfaces has a generally concave shape to form a positive rake angle.

14. The cutting insert according to claim 12 wherein each of the third and fourth edge surfaces has a recess formed therein; wherein the recess of the third edge surface intersects the second side surface at a location between the two cutting corners disposed on the second side surface and has a depth increasing as such recess approaches the second side surface, the recess of the fourth edge surface intersecting the first side surface at a location between the two cutting corners disposed on the side surface and having a depth increasing as such recess approaches the first side surface; each cassette including an axial support surface facing in a direction parallel to the axis of rotation and received in one of the recesses of a respective cutting insert.

15. The cutting insert according to claim 12 wherein each side surface includes two elongated recesses extending on respective sides of the respective clamping cavity and intersecting respective ones of the third and fourth edge surfaces; each side surface further including a planar surface disposed adjacent the elongated recesses and seated on a base surface defined by a respective cassette.

16. The cutting insert according to claim 10 wherein each of the third and fourth edge surfaces has a recess formed therein; wherein the recess of the third edge surface intersects the second side surface at a location between the two cutting corners disposed on the second side surface and has a depth increasing as such recess approaches the second side surface, the recess of the fourth edge surface intersecting the first side surface at a location between the two cutting corners disposed on the first side surface and having a depth increasing as such recess approaches the first side surface; the milling body including an axial support surface facing in a direction parallel to the axis of rotation and arranged stationarily relative to the milling body, the axial support surface received in one of the recesses of a respective cutting insert.

17. The cutting insert according to claim 10 wherein each side surface includes two elongated recesses extending on respective sides of the respective clamping cavity and intersecting respective ones of the third and fourth edge surfaces; each side surface further including a planar surface disposed adjacent the elongated recesses and seated on a base surface at a respective pocket.

18. An indexable cutting insert for milling, the insert having a rectangular basic shape and comprising first and second opposite side surfaces intersected by first, second, third and fourth edge surfaces; the first and second edge surfaces lying opposite one another, and the third and fourth side surfaces lying opposite one another; the insert including four pairs of cutting edges, each pair of cutting edges including a major cutting edge and a minor cutting edge meeting at a respective cutting corner of the insert; two of the major cutting edges formed by transitions between the first side surface and the first and second edge surfaces, respectively, and the remaining two major cutting edges formed by transitions between the second side surface and the first and second edge surfaces, respectively; wherein the insert is a double-sided insert with the side surfaces constituting rake faces and the edge surfaces constituting flank faces; the first side surface having two of the cutting corners whose minor cutting edges are each formed by a transition between the first side surface and the third edge surface; the second side surface having two of the cutting corners whose minor cutting edges are each formed by a transition between the second side surface and the fourth edge surface; each of the first and second side surfaces intersected by a clamping cavity which defines a center axis; wherein a cutting corner of the first side surface located diagonally opposite a cutting corner of the second side surface defines therewith a bisector plane of the insert which plane substantially contains the center axis; the third and fourth edge surfaces providing positive clearance and being substantially parallel with one another, wherein each of the third and fourth edge surfaces has a recess formed therein; wherein the recess of the third edge surface intersects the second side surface at a location between the two cutting corners disposed on the second side surface and has a depth increasing as such recess approaches the second side surface, the recess of the fourth edge surface intersecting the first side surface at a location between the two cutting corners disposed on the first and side surface and having a depth increasing as such recess approaches the first side surface.

19. A milling tool comprising a rotary milling body in combination with indexable cutting inserts, the milling body defining an axis of rotation and including a plurality of circumferentially spaced insert pockets receiving respective cutting inserts; the first and second edge surfaces lying opposite one another, and the third and fourth edge surfaces lying opposite one another; each cutting insert having a rectangular basic shape and comprising first and second opposite side surfaces intersected by first, second, third and fourth edge surfaces; the insert including four pairs of cutting edges spaced from the milling body, each pair of cutting edges including a major cutting edge and a minor cutting edge meeting at a respective cutting corner of the insert; two of the major cutting edges formed by transitions between the first side surface and the first and second edge surfaces, and the remaining two major cutting edges formed by transitions between the second side surface and the first and second edge surfaces; wherein the insert is a double-sided insert with the side surfaces constituting rake faces and the edge surfaces constituting flank faces; the first side surface having two of the cutting corners whose minor cutting edges are each formed by a transition between the first side surface and the third edge surface; the second side surface having two of the cutting corners whose minor cutting edges are each formed by a transition between the second side surface and the fourth edge surface; each of the first and second side surfaces intersected by a clamping cavity which defines a center axis; wherein a cutting corner of the first side surface located diagonally opposite a cutting corner of the second side surface defines therewith a bisector plane of the insert which substantially contains the center axis, the third and fourth edge surfaces providing positive clearance and being substantially parallel with one another, the milling tool further including cassettes mounted in respective pockets, each cassette including a groove receiving a projection of the respective pocket, wherein each side surface includes two elongated recesses extending on respective sides of the respective clamping cavity and intersecting respective ones of the third and fourth edge surfaces; each side surface further including a planar surface disposed adjacent the elongated recesses and seated on a base surface defined by a respective cassette.

20. A milling tool comprising a rotary milling body in combination with indexable cutting inserts, the milling body defining an axis of rotation and including a plurality of circumferentially spaced insert pockets receiving respective cutting inserts; the first and second edge surfaces lying opposite one another, and the third and fourth edge surfaces lying opposite one another; each cutting insert having a rectangular basic shape and comprising first and second opposite side surfaces intersected by first, second, third and fourth edge surfaces; the insert including four pairs of cutting edges spaced from the milling body, each pair of cutting edges including a major cutting edge and a minor cutting edge meeting at a respective cutting corner of the insert; two of the major cutting edges formed by transitions between the first side surface and the first and second edge surfaces, and the remaining two major cutting edges formed by transitions between the second side surface and the first and second edge surfaces; wherein the insert is a double-sided insert with the side surfaces constituting rake faces and the edge surfaces constituting flank faces; the first side surface having two of the cutting corners whose minor cutting edges are each formed by a transition between the first side surface and the third edge surface; the second side surface having two of the cutting corners whose minor cutting edges are each formed by a transition between the second side surface and the fourth edge surface; each of the first and second side surfaces intersected by a clamping cavity which defines a center axis; wherein a cutting corner of the first side surface located diagonally opposite a cutting corner of the second side surface defines therewith a bisector plane of the insert which substantially contains the center axis, the third and fourth edge surfaces providing positive clearance and being substantially parallel with one another, wherein each of the third and fourth edge surfaces has a recess formed therein; wherein the recess of the third edge surface intersects the second side surface at a location between the two cutting corners disposed on the second side surface and has a depth increasing as such recess approaches the second side surface, the recess of the fourth edge surface intersecting the first side surface at a location between the two cutting corners disposed on the first side surface and having a depth increasing as such recess approaches the first side surface; the milling body including an axial support surface facing in a direction parallel to the axis of rotation and arranged stationarily relative to the milling body, the axial support surface received in one of the recesses of a respective cutting insert.

* * * * *